(12) United States Patent
Johnson et al.

(10) Patent No.: US 10,375,968 B2
(45) Date of Patent: Aug. 13, 2019

(54) METHOD FOR MAKING A SHAPED SNACK CHIP

(71) Applicant: FRITO-LAY NORTH AMERICA, INC., Plano, TX (US)

(72) Inventors: Timothy Allen Johnson, Plano, TX (US); Scott Alan Richey, Plano, TX (US); Richard James Ruegg, Coppell, TX (US); Sidharth Sambashivan, Dallas, TX (US); Rogers Williams, McKinney, TX (US)

(73) Assignee: Frito-Lay North America, Inc., Plano, TX (US)

( * ) Notice: Subject to any disclaimer, the term of this patent is extended or adjusted under 35 U.S.C. 154(b) by 1008 days.

(21) Appl. No.: 14/207,196

(22) Filed: Mar. 12, 2014

(65) Prior Publication Data
US 2014/0272064 A1 Sep. 18, 2014

Related U.S. Application Data

(60) Provisional application No. 61/791,875, filed on Mar. 15, 2013.

(51) Int. Cl.
*A47J 37/04* (2006.01)
*A21D 8/06* (2006.01)
(Continued)

(52) U.S. Cl.
CPC .............. *A21D 8/06* (2013.01); *A21C 9/08* (2013.01); *A21C 9/081* (2013.01); *A21C 9/083* (2013.01);
(Continued)

(58) Field of Classification Search
CPC .......... A23L 1/217; A23L 1/2175; A23L 5/12; A23L 5/15; A23L 5/34; A23L 17/117;
(Continued)

(56) References Cited

U.S. PATENT DOCUMENTS 3,653,335 A 4/1972 Griner
3,747,508 A 7/1973 Elam
(Continued)

FOREIGN PATENT DOCUMENTS

CA 2772721 A1 9/2012
EP 1433386 A1 6/2004
(Continued)

OTHER PUBLICATIONS

International Search Report and Written Opinion from PCT/US2014/028558 dated Jul. 31, 2014 (8 pages).
(Continued)

*Primary Examiner* — Drew E Becker
*Assistant Examiner* — Bryan Kim
(74) *Attorney, Agent, or Firm* — Colin P. Cahoon; Stephen Y. Liu; Carstens & Cahoon, LLP

(57) ABSTRACT

The invention is an improved process and system for producing a shaped snack chip. A shaping oven, which uses a chain edge conveyor having transverse slats with at least one spring affixed to the slats, is used to convert dough pieces into shaped pre-forms, which can optionally be further dehydrated to form shaped snack chips.

16 Claims, 2 Drawing Sheets

(51) Int. Cl.

| | | |
|---|---|---|
| *A21C 9/08* | (2006.01) | |
| *A23P 10/10* | (2016.01) | |
| *A23L 19/12* | (2016.01) | |
| *A23L 19/10* | (2016.01) | |
| *A23L 5/10* | (2016.01) | |
| *A23L 19/00* | (2016.01) | |
| *A23L 7/117* | (2016.01) | |
| *A23L 19/18* | (2016.01) | |
| *A23P 30/10* | (2016.01) | |

(52) U.S. Cl.
CPC ............. *A21C 9/085* (2013.01); *A21C 9/088* (2013.01); *A23L 5/15* (2016.08); *A23L 5/17* (2016.08); *A23L 7/117* (2016.08); *A23L 19/09* (2016.08); *A23L 19/10* (2016.08); *A23L 19/12* (2016.08); *A23L 19/18* (2016.08); *A23L 19/19* (2016.08); *A23P 10/10* (2016.08); *A23P 30/10* (2016.08)

(58) Field of Classification Search
CPC .. A23L 19/18; A23L 19/19; A21D 8/06; A47J 37/04; A47J 37/041; A47J 37/042; A47J 37/043; A47J 37/044; A47J 37/045; A23P 10/00; A23P 10/10; A23P 30/00; A23P 30/10; A21B 1/42; A21B 1/48; A21B 1/50
USPC ....... 426/144, 245, 247, 438, 439, 143, 502, 426/512, 514; 99/427, 432; 425/324.1
See application file for complete search history.

(56) References Cited

U.S. PATENT DOCUMENTS

| | | | |
|---|---|---|---|
| 3,794,455 A | 2/1974 | Heiderpriem | |
| 3,800,054 A | 3/1974 | Giesfeldt | |
| 3,869,971 A | 3/1975 | Driscoll | |
| 4,208,441 A | 6/1980 | Westover | |
| 4,649,055 A * | 3/1987 | Kohlwey | A23L 1/182 426/443 |
| 5,298,707 A | 3/1994 | Sprecher | |
| 5,392,698 A * | 2/1995 | Sprecher | A23L 1/0128 198/699.1 |
| 3,267,836 A | 8/1996 | Yepis | |
| 5,601,012 A | 2/1997 | Ellner | |
| 5,765,470 A | 6/1998 | Sitro | |
| 6,327,968 B1 | 12/2001 | Scannell | |
| 6,592,923 B2 | 7/2003 | Chandler | |
| 6,796,301 B2 | 9/2004 | Haas | |
| 7,597,917 B2 | 10/2009 | Kortum | |
| 7,914,834 B2 | 3/2011 | Fu | |
| 2003/0066436 A1 | 4/2003 | Bell | |
| 2005/0089604 A1 | 4/2005 | Pastore | |
| 2008/0138480 A1* | 6/2008 | Bows | A23P 30/32 426/465 |
| 2008/0171122 A1* | 7/2008 | Agnello | A21B 5/026 426/523 |
| 2010/0097317 A1 | 4/2010 | Li | |
| 2011/0091521 A1 | 4/2011 | Omelchenko | |
| 2011/0111105 A1 | 5/2011 | Besse | |
| 2013/0078345 A1* | 3/2013 | Bender | A23L 1/0073 426/143 |

FOREIGN PATENT DOCUMENTS

| | | | |
|---|---|---|---|
| GB | 2053776 A | 2/1981 | |
| GB | 2481875 A * | 1/2012 | ............. H05B 6/782 |
| WO | 00/08950 | 2/2000 | |
| WO | 01/84955 A2 | 11/2001 | |
| WO | 20071093005 A1 | 8/2007 | |
| WO | 2012/104219 A1 | 8/2012 | |

OTHER PUBLICATIONS

Pidy.com, R&D—Innovaction; downloaded from the Internet at http://pidy.com/item.php?itemno=160_228&lang-EN (2 pages).
Bostandzic, Denis, Oct. 31, 2010 personal blog, downloaded from the Internet at http://www.denisbostandzic.com (4 pages).

* cited by examiner

METHOD FOR MAKING A SHAPED SNACK CHIP

CROSS REFERENCE TO RELATED APPLICATION

This application claims the benefit of provisional U.S. Application No. 61/791,875 entitled "Method for Making a Shaped Snack Chip," filed Mar. 15, 2013, the technical disclosure of which is incorporated herein in its entirety.

BACKGROUND OF THE INVENTION

1. Technical Field

The present invention is directed towards a method and system for making shaped snack products efficiently and cost-effectively.

2. Description of the Related Art

Snack foods are popular and convenient foods for which there exists a great demand. Snack foods take many different forms, from snack chips or crisps, which can be made from food product slices or pieces of a sheeted dough, to extruded products, which produced by a dough forced through an orifice at high pressure. U.S. Pat. No. 6,592,923 describes one system and method for making a shaped snack product. However, the system described therein is complex and expensive. Piece alignment is a major challenge in that system. It would be an improvement in the art to provide a method and system for making shaped snack food products more efficiently and effectively than currently available in the art.

SUMMARY OF THE INVENTION

The present invention is directed towards an apparatus and method for making a shaped snack food product. In one embodiment, a method for making a plurality of shaped food products comprises providing food product preforms, transferring said preforms to a shaping oven, wherein said shaping oven comprises a conveyor comprising at least one convex mold, and drying said preforms inside said shaping oven to form shaped pre-forms. Each said shaped pre-form may comprise an undulating or wavy shape. The at least one spring can comprise a plurality of coil springs or at least one wire mesh spring.

In another embodiment, the providing step comprises sheeting a dough and cutting said dough into preforms. The dough can be at least one of a masa dough, a potato flake dough, and a wheat-based dough.

In another embodiment, the method further comprises finish drying said shaped pre-forms to produce shaped snack chips. Finish drying may include at least one of hot oil frying, hot air drying, vacuum drying, impingement drying, infrared drying or microwave drying.

In one embodiment, the method does not align said preforms with said at least one convex mold. The at least one convex mold may comprise a bar affixed to said conveyor, and wherein said finish drying step produces said shaped snack chips having a rolled shape. The conveyor may further comprise a wire mesh conveyor having at least one said convex mold attached, or a chain edge conveyor with slats attached to said chain edge, wherein said at least one convex mold is affixed to said slats.

In one embodiment, a shaping oven comprises a heated cavity having an endless conveyor adapted to transfer food product preforms through said heated cavity, wherein said conveyor comprises at least one convex mold. The conveyor may further comprise a chain edge conveyor with slats attached to said chain edge, wherein said at least one convex mold is affixed to said slats, or a wire mesh conveyor wherein said at least one convex mold is affixed to said conveyor. These as well as additional features and advantages of the present invention will become apparent in the following written description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
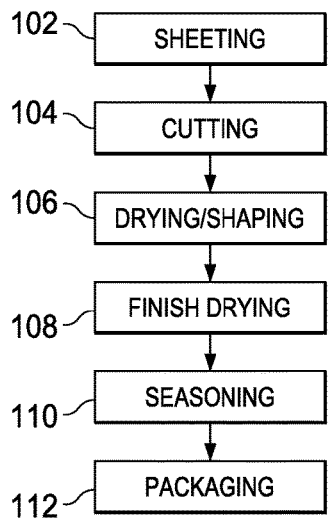
FIG. 1 is a flow chart indicating the processing steps for the present invention.

In one embodiment, the shaped snack food products of the present invention are prepared from pieces of dough which has been sheeted and cut. FIG. 1 is a flowchart indicating the processing steps for the present invention. In one embodiment, a dough is sheeted 102 between two counter-rotating rollers and cut into pieces 104. The dough pieces or preforms are dried 106 in a shaping oven, which comprises a conveyor belt with a plurality of molds attached to form shaped pre-forms. The shaped pre-forms are then optionally finish dried in further drying steps 108 and optionally seasoned 110 and optionally packaged 112 for ultimate sale. In some embodiments, a toasting or proofing step is optionally used to partially dehydrate the dough pieces prior to the shaping oven. In other embodiments, one or more other drying or processing steps can optionally be interspersed before or after any of the steps shown in FIG. 1.

The dough used to make the sheeted, cut pieces used in accordance with the present invention can be virtually any sheeted food product known in the art. For example, a masa dough that is known to be sheeted and cut to make tortilla chips can be used in accordance with the present invention. Additionally, a fabricated potato chip dough made from hydrated potato flakes can also be used in accordance with the present invention. Other sheeted, dried products that are known in the art, based, for example, on starch, potato, corn, wheat, oat, rice, multi-grain, fruit or vegetable, and any combination thereof, can also be used in conjunction with the principles of the present invention. For example, pretzel preforms or extruded preforms can be shaped according to the principles disclosed herein.

Figure 2:
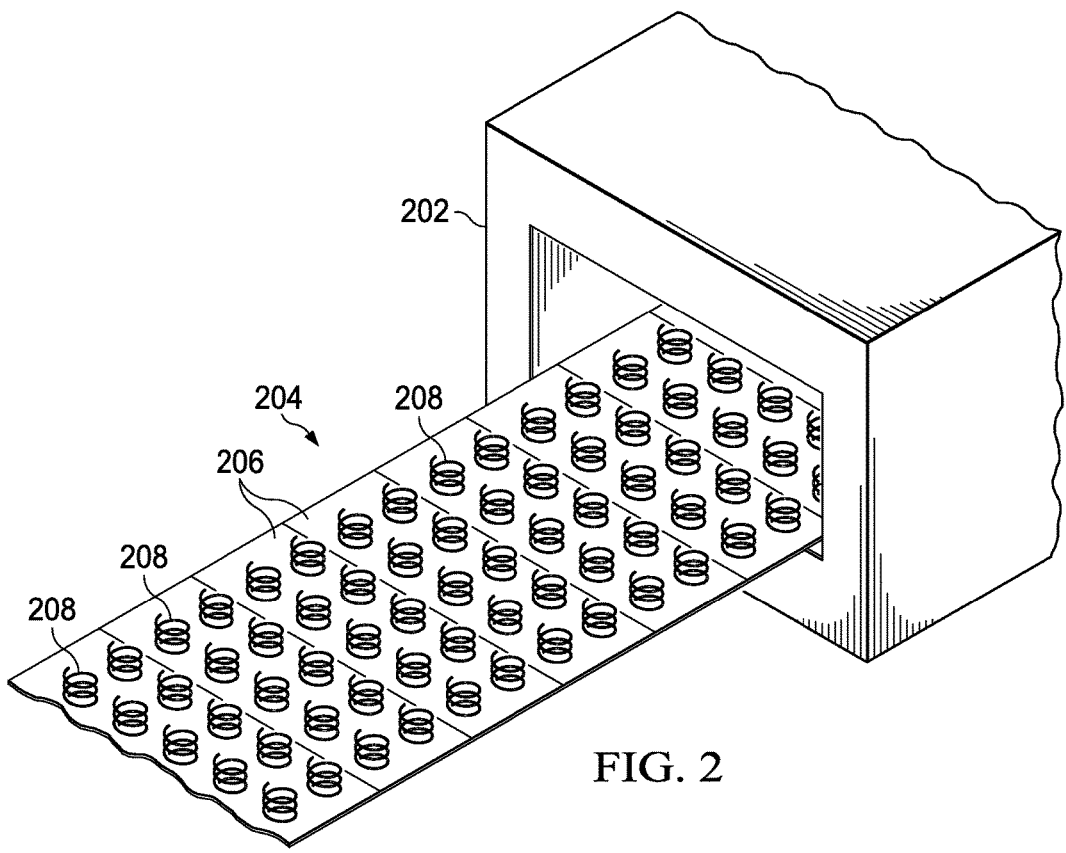
FIG. 2 is a perspective view of a portion of the oven and conveyor belt in accordance with one embodiment of the present invention.

In one embodiment a dough is sheeted between two counter-rotating rollers and cut into dough pieces. The dough pieces are then transferred by conveyor into the shaping oven. FIG. 2 depicts one embodiment of the conveyor and shaping oven 202 of the present invention. As shown therein, the shaping oven uses a conveyor belt 204 comprising a plurality of transverse slats 206 mounted on each end to a chain edge (not shown) of the conveyor. It should be noted that the chain edge of the conveyor belt is not necessarily a chain, but can be a similar structure, such as a belt or cable. In one embodiment, the slats are easily removable and replaceable with slats designed to produce products of different shape. Examples of removable or replaceable slats are slats which are bolted or affixed by a pressure clip to the chain edge of the conveyor. In another embodiment, the slats are relatively flat pieces of metal, ceramic, or other heat-tolerant material. Other types of belts, such as wire mesh belts, may also be used.

In one embodiment, a plurality of convex molds 208 is attached to each slat 206, or directly to a wire mesh conveyor belt. The convex molds 208 serve to alter the usually flat shape of the dough pieces and produce shaped pre-forms. Absent the presence of the convex, concave or combination molds, the dough pieces would lay substantially flat when traveling through the oven. This presents two changes made possible by the present invention. First, the use of flat, bare slats will produce snack piece pre-forms that are themselves flat when viewed on edge. The present invention can produce snack pieces that are not flat. Second, if the flat slats are solid (which is typically required for rigidity between the chain edges of the conveyor), it is difficult for moisture to escape the dough piece from the surface adjacent to the slat. Consequently, the dough piece will dehydrate in a non-uniform and less efficient manner. The present invention can alter the drying dynamics in the production of snack pieces.

By affixing at least one convex mold to the slats on the surface that carries the dough pieces through the shaping oven, a practitioner of the present invention can produce sheeted snack products having interesting and useful shapes. Gravity provides the main shaping force as the preforms are draped, in whole or in part, over the mold surfaces.

Figure 3:
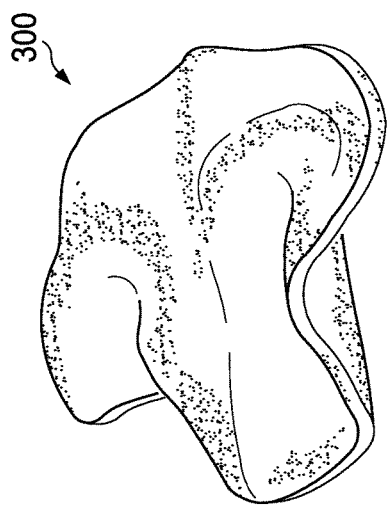
FIG. 3 is a perspective view of a shaped snack product made in accordance with one embodiment of the present invention.

For example, as depicted in FIG. 2, a plurality of coil springs is affixed to the slats of the shaping oven. When the shaping oven depicted in FIG. 2 is used to partially dehydrate and shape sheeted, cut dough pieces to produce shaped pre-forms, and such pre-forms are subsequently dried to a moisture content below about 3% by weight and examined, the process produces snack chips having an undulating shape. One embodiment of a snack chip having an undulating shape is depicted by snack chip 300 in FIG. 3.

A snack chip with an undulating shape has several distinct advantages over prior art flat snack chips. First, the snack chips typically comprise at least one bowl-like indentation that can be used to more efficiently scoop and consume dip. The undulating shape also decreases the bulk density of the snack chips, which resists settling of the chips during packaging and handling. The undulating shape also increases breakage resistance in the snack chips. When snack chips have a flat shape, there exists a long moment arm on the chip which can magnify on one side of the arm a force applied to the other side. An undulating snack chip made according to the present invention has shorter, curved moment arms, and is therefore less prone to breakage during packaging and handling.

The plurality of convex molds also separates the dough pieces from the conveyor. This allows moisture to escape from the side of the dough piece closer to the conveyor, resulting in more uniform and efficient dehydration of the dough pieces.

Figure 4:
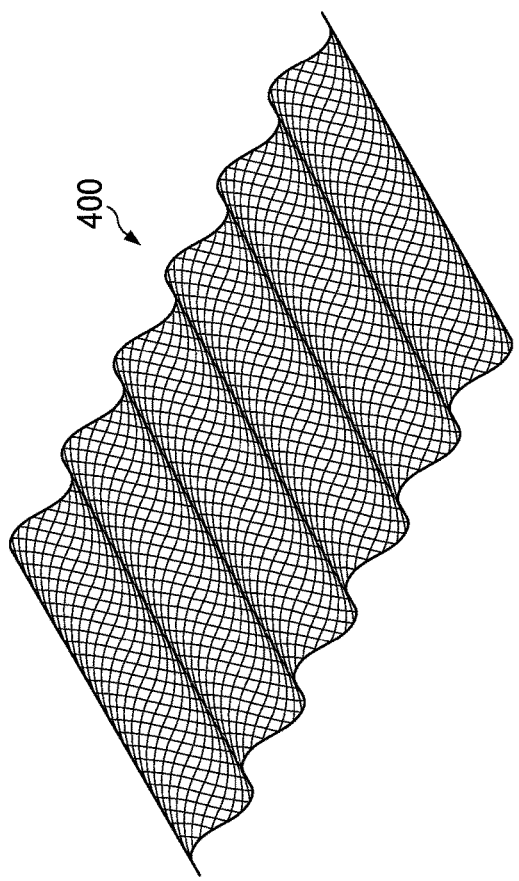
FIG. 4 is a perspective view of a wavy spring used with one embodiment of the present invention.

The coil springs depicted in FIG. 2 are not the only embodiment of convex molds that fall within the scope of the present invention. Other springs of difference shape can be made by bending metal wire mesh into the desired shape, and affixing such springs to the shaping oven slats. For example, Generally square or rectangular pieces of flat wire mesh can be bent into a wavy shape, as depicted by convex mold 400 in FIG. 4. A single wire mesh spring that produces pre forms with an undulated shape could also be made by bending a single sheet of wire mesh into an undulating shape and affixing it to each slat in the shaping oven. the possibilities for spring shapes and sizes are almost limitless. In fact, heat tolerant members other than springs can also be attached to the conveyor to shape the dough pieces and form shaped pre-forms. Such members can comprise stamped or machined metal pieces that can be attached to the conveyor, or threaded members that screw into the conveyor, which can have heads of varying shape, such as a six-sided polygon sometimes referred to as a hex nut. In another embodiment, the belt surface comprises a mixture of concave and convex mold surfaces.

In one embodiment, the springs or members attached to the conveyor are made of a metal or ceramic that tolerates temperatures exceeding 650° F. without deforming. A preferred material used to make the spring wire is 17-7 PH Stainless Steel wire (ASTM A313). Preferably, the wire diameter is about 0.061 inches in diameter, but the diameter could range from about 0.040 to 0.120 inches. A thicker wire will transfer heat better than a thinner wire.

The use of springs affixed to the conveyor has several distinct advantages over other methods of molding. First, U.S. Pat. No. 6,592,923, referred to above, is a complex and expensive process for making a bowl shaped snack chip. As described therein, the dough pieces must be lined up with the molds, and a plunger forces the dough pieces down into the molded shape. By contrast, with one embodiment of the present invention, no dough piece alignment or plungers are needed to form the molded shape. As sheeted and cut dough pieces, especially dough pieces produced by a laceless or low-lace cutting pattern, are transferred to the conveyor belt, the dough pieces bend and flex by the force of gravity to approximate the shape of the spring surface, and the shaped preforms emerge with an undulating surface. The term "lace" is used to describe the sections of the dough sheet that is between the preforms after they are cut. Lace is generally treated as dough scrap, and may be recycled back to earlier steps in the process. A laceless pattern is one that produces dough preforms with little or no scrap. One example of a laceless pattern is a hexagonal pattern that has each side of each dough preform coterminous with an adjacent dough preform, except the preforms nearest to the outer edges of the cutter. A low-lace cutting pattern is one in which many dough preforms share at least one edge, but perhaps generate a line of scrap between rows or columns of preforms.

When an alignment step is omitted from the method, the spacing of the convex molds should be such that substantially all of the dough preforms will at least partially touch at least one mold surface. Dough preforms, regardless of shape, can be described as having a major diameter. A major diameter is the longest straight line segment that crosses at least a portion of the dough preform, and has endpoints that lie on the outer edge of the dough preform. For a circular preform the major diameter equals the diameter of the circle.

For hexagonal, triangular, or irregularly shaped preforms, the major diameter will depend on the particular geometry of the preform.

In a preferred embodiment, the spacing between convex molds is less than the major diameter of the dough preforms. This arrangement will ensure that at least a portion of each preform will be at least partially molded. As the molds become more closely spaced in comparison to the dough preform's major diameter, the molds have a larger effect on the shape of the resulting snack chips. In another embodiment, the spacing between the convex molds is at least 10% less, or at least 20% less than the major diameter of the preforms. In one embodiment, the spacing between the convex molds is at least 50% less than the major diameter of the preforms. In this embodiment, two molds can affect the shape of each snack chip.

Although in the embodiment that lacks any alignment step every snack piece might not have an identical shape, the molds can be spaced closely enough that every snack piece does comprise at least one bowl shaped indention because even though the dough pieces are not necessarily aligned with the molds, there is not enough space between any two molds to allow a dough piece to remain flat as it passes through the shaping oven. The omission of an alignment step can substantially reduce the cost and complexity of the production process, yet the present invention still produces snack chips with improved scooping ability.

Other known molding processes involve the use of a top and bottom plate, which come together after a product has been placed or poured into the bottom plate. For example, U.S. Pat. No. 5,601,012 uses corresponding concave and convex surfaces of a mold to bake uniform bread bowls. A similar process that utilizes of top and bottom moving parts uses a stamp, press or plunge to form shaped food products from intermediates. The present invention is far simpler and less expensive from a capital and operational cost standpoint than these previous methods of molding food products into shapes.

Inside the shaping oven, the dough pieces are dehydrated to a point where the shaped pre-forms will retain their shape in subsequent processing steps. The level of dehydration needed will vary according to the type of sheeted dough being cooked. In one embodiment, the dough pieces enter the shaping oven at a moisture content of between about 45% and 55% by weight. Depending on the initial moisture content of the dough when it is made, a pre-drying, toasting or proofing step may be required to bring the moisture content down prior to entering the shaping oven. In a preferred embodiment, the toasting and shaping occurs in the same oven.

In one embodiment, the shaped pre-forms exit the shaping oven at a moisture content of between about 25% and 35% by weight. At this moisture content, the pre-forms are typically rigid enough to maintain their shape through subsequent processing steps.

The method of dehydrating used inside the shaping oven is preferably one or a combination of infrared heating and gas ribbon burner heating. In one embodiment, the shaping oven comprises at least one infrared heating element above the product conveyor and ribbon burner heaters below the product conveyor. In other embodiments, the dough pieces are heated using any method known in the art, such as hot air convection, impingement drying, microwave drying, infrared drying or vacuum drying. In one embodiment, the temperature inside the shaping oven is at least 500° F. In a preferred embodiment, the temperature inside the shaping oven is at least 1500° F.

In one embodiment, the dough pieces are fully dehydrated inside the shaping oven. In a preferred embodiment, the dough pieces are subjected to at least one further dehydration step to bring the moisture content below about 3%, and more preferably, below about 2%, by weight.

After the pre-forms exit the shaping oven, they can be further processed using any drying technique known in the art. In a preferred embodiment, the shaped pre-forms are processed according to at least one of the following methods: fried in a hot oil bath, baked in a hot air oven, baked in an impingement oven, or dehydrated in an oven that uses microwaves or infrared energy.

Example 1

A masa dough comprising ground corn, oil and water was sheeted to a thickness of about 0.035 inches between two counter-rotating rollers. The moisture content of the masa dough was approximately 50% by weight. The masa dough sheet was cut into pieces approximately the size and shape of commercially available tortilla chips using a roller cutter known in the art.

The masa dough pieces were transferred into a shaping oven constructed according to one embodiment of the present invention. The shaping oven comprised a chain edge conveyor belt with transverse slats that fed products into and through the oven. A plurality of coil springs was affixed to each of the slats. The coil springs were constructed of 0.061 inch diameter stainless steel wire. The coil springs were affixed to the slats by a center post anchoring the end of the spring opposite the slat, and the end of the spring nearest the slat being pushed through a hole and bent over. The springs were spaced about 2 inches apart in the direction of travel, and about 2.5 inches apart in the transverse direction. The springs protruded from the slats approximately 0.625 inches, and comprised an outside diameter of about 1.4 inches.

The belt temperature inside the shaping oven was between about 500° F. and 700° F. The dwell time of the dough pieces inside the shaping oven was approximately 8-10 seconds, and the shaped pre-forms exited the oven at a moisture content of about 28-31% by weight. The shaped pre-forms were then fried in hot oil to a moisture content of less than 3% by weight. The final products produces by this process were tortilla chips having an undulating shape when viewed on edge, resembling the shape depicted in FIG. 3.

Example 2

A masa dough comprising ground corn, oil and water was sheeted to a thickness of about 0.035 inches between two counter-rotating rollers. The moisture content of the masa dough was approximately 50% by weight. The masa dough sheet was cut into round preforms using a roller cutter known in the art.

Figure 5:
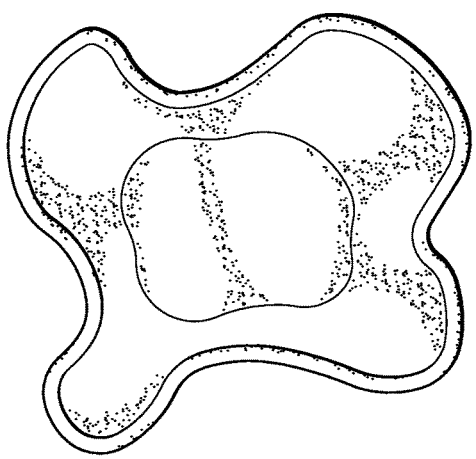
FIG. 5 is a perspective view of a shaped snack product made in accordance with another embodiment of the present invention.

Each round preform was then placed on top of a 0.75 inch hex nut attached to the conveyor of a shaping oven. The shaping oven comprised high intensity infrared heaters set at 1,700° F. and spaced between approximately 3 and 5 inches above the preforms. The dwell time of the preforms inside the shaping oven was about three seconds. The shaped preforms were then toasted in a toaster oven and fried in hot vegetable oil. A perspective view of the shaped snack product made according to this Example 2 is depicted in FIG. 5.

Example 3

Figure 6:
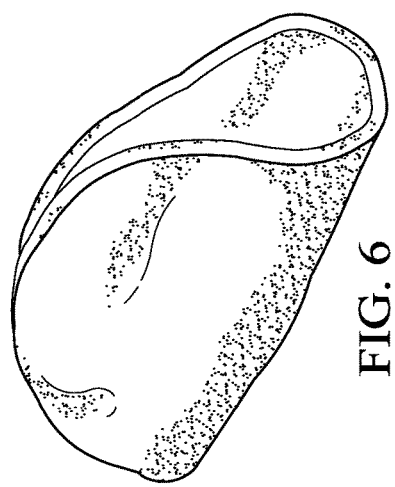
FIG. 6 is a perspective view of a shaped snack product made in accordance with another embodiment of the present invention.

Round preforms were made as described in Example 2 above. Each round preform was placed over a bar affixed to the conveyor of the shaping oven described in Example 2. Upon exiting the shaping oven, the shaped preforms resembled the half-moon face and U-shaped cross-section of known crispy taco shells. However, after the shaped preforms were fried to a final moisture content below about 2%, the shaped preforms continued to curl inwards to form a tube shaped snack food product made from a round preform. This shape is sometimes referred to as a taquito or rolled taco shape, and a perspective view of such a snack chip is shown in FIG. 6. Without being limited by theory, Applicants believe that a moisture differential is created between the side of the preform facing the infrared heaters in the shaping oven, and the side opposite the heaters. When the shaped preform is then fried in hot oil, moisture escaping from the surface that was opposite the heaters causes that surface to continue to curl inwards. This, in one embodiment, a post-shaping drying (or frying) step further alters the shape of the shaped preform. In a preferred embodiment, the post-shaping drying step curls the shaped preform towards the side of the preform previously in contact with the mold (or mold-side of the shaped preform).

While the invention has been particularly shown and described with reference to a preferred embodiment, it will be understood by those skilled in the art that various changes in form and detail may be made therein without departing from the spirit and scope of the invention. For example, the dimensions may be changed to increase or decrease the overall size of the snack chips; the shapes of the snack chips may be changed; and the snack chip composition may be varied to adjust the texture and flavor of the final product, and to accommodate various flavor combinations and/or inclusions. Further, the means for cutting the product need not be one particular type, but could include any number of commonly available cutting devices. Different thicknesses of the final product may be desired. The overall intent of this invention is to create a shaped snack chip that can be manufactured in an efficient manner. Also, other baked or fried food products, such as pretzels, may also be produced on the equipment and according to the method of the present invention.

What is claimed is:

1. A method for making a plurality of shaped food products, said method comprising the steps of:
   providing flat food product preforms;
   transferring said flat food product preforms onto a conveyor of a shaping oven to form shaped preforms, wherein said conveyor further comprises a plurality of convex molds attached to a planar surface of the conveyor, and wherein the transferring step causes the food product preforms to engage one or more of the plurality of convex molds; and
   drying said shaped preforms inside said shaping oven to form the shaped preforms rigid enough to maintain their shape, wherein said method lacks any alignment step that aligns the food product preforms with the plurality of convex molds.

2. The method of claim 1 wherein each said shaped preform comprises an undulating shape.

3. The method of claim 2 wherein at least one of said plurality of convex molds comprises a coil spring.

4. The method of claim 1 wherein at least one of said plurality of convex molds comprises a wire mesh spring.

5. The method of claim 1 wherein said providing comprises: sheeting a dough and cutting said dough into said food product preforms.

6. The method of claim 1 further comprising finish drying said shaped preforms to produce shaped snack chips.

7. The method of claim 6 wherein said finish drying consists of at least one of hot oil frying, hot air drying, vacuum drying, impingement drying, infrared drying or microwave drying.

8. The method of claim 6 wherein at least one of said convex molds comprises a bar affixed to said conveyor, and wherein said finish drying step produces said shaped snack chips having a rolled shape, wherein the rolled shape further comprises a U-shaped cross-section.

9. The method of claim 1 wherein said conveyor further comprises a wire mesh conveyor having said plurality of convex molds attached.

10. The method of claim 1 wherein said conveyor further comprises a chain edge conveyor with slats attached to said chain edge, wherein said plurality of convex molds is affixed to said slats.

11. The method of claim 5 wherein said dough is at least one of a masa dough, a potato flake dough, and a wheat-based dough.

12. The method of claim 1 wherein substantially all of the food product preforms at least partially touch at least one mold surface during said drying step.

13. The method of claim 1, wherein the transferring step further causes at least some of the food product preforms to also engage the planar surface of the conveyor.

14. The method of claim 1, wherein a spacing between each of the plurality of convex molds is less than a major diameter of the food product preforms.

15. The method of claim 14, wherein the spacing between each of the plurality of convex molds is at least 50% less than the major diameter of the food product preforms.

16. The method of claim 15, wherein one or more of the plurality of food product preforms engage at least two of the plurality of convex molds.

* * * * *